March 19, 1935.  W. SCHAELCHLIN  1,994,925
INDUCTIVE TIME LIMIT ACCELERATION
Filed March 15, 1933

WITNESSES:
C. J. Willer.
Paul E. Friedemann

INVENTOR
Walter Schaelchlin.
BY
W. R. Coley
ATTORNEY

Patented Mar. 19, 1935

1,994,925

UNITED STATES PATENT OFFICE 1,994,925

INDUCTIVE TIME-LIMIT ACCELERATION

Walter Schaelchlin, Wilkinsburg, Pa., assignor to Westinghouse Electric & Manufacturing Company, East Pittsburgh, Pa., a corporation of Pennsylvania Application March 15, 1933, Serial No. 660,954

15 Claims. (Cl. 172—288)

This invention relates to electrical control systems for starting and stopping electric motors.

More specifically, this invention relates to systems of control for electric motors, wherein the motors are accelerated to full operating speed in successive steps and wherein these steps may be adjusted to take place in successive predetermined and equal or, when desired, unequal intervals of time.

Devices of this general character are well known in the art, but the devices of the present art must, of necessity, include a plurality of "setup" relays and auxiliary control circuits, thereby very materially increasing the cost and complexity of the control system.

With existing devices, the time of acceleration of a motor cannot be effectively controlled and, because of the complexity of the control systems, their reliability is materially affected.

One of the objects of this invention is to provide a control system for electric motors that shall be simple, efficient and reliable and which may be readily and economically manufactured.

A further object of this invention is to directly control the shunting of the accelerating resistors of motors in response to inductive time constants of electrical devices.

A more specific object of this invention is the provision of accelerating contactors responsive to their respective inductive time constants to shunt successive accelerating resistors to accelerate an electric motor.

It is also an object of this invention to accelerate an electric motor by inductive time-limit control.

A broader object of this invention is to accelerate an electric motor within a substantially definite and predetermined interval of time, independent of the current conditions in the motor armature or the counter-electromotive force of the motor.

Other, and more specific, objects of this invention will become apparent from a study of the following specification, in conjunction with the accompanying drawing, in which.

Figure 1:
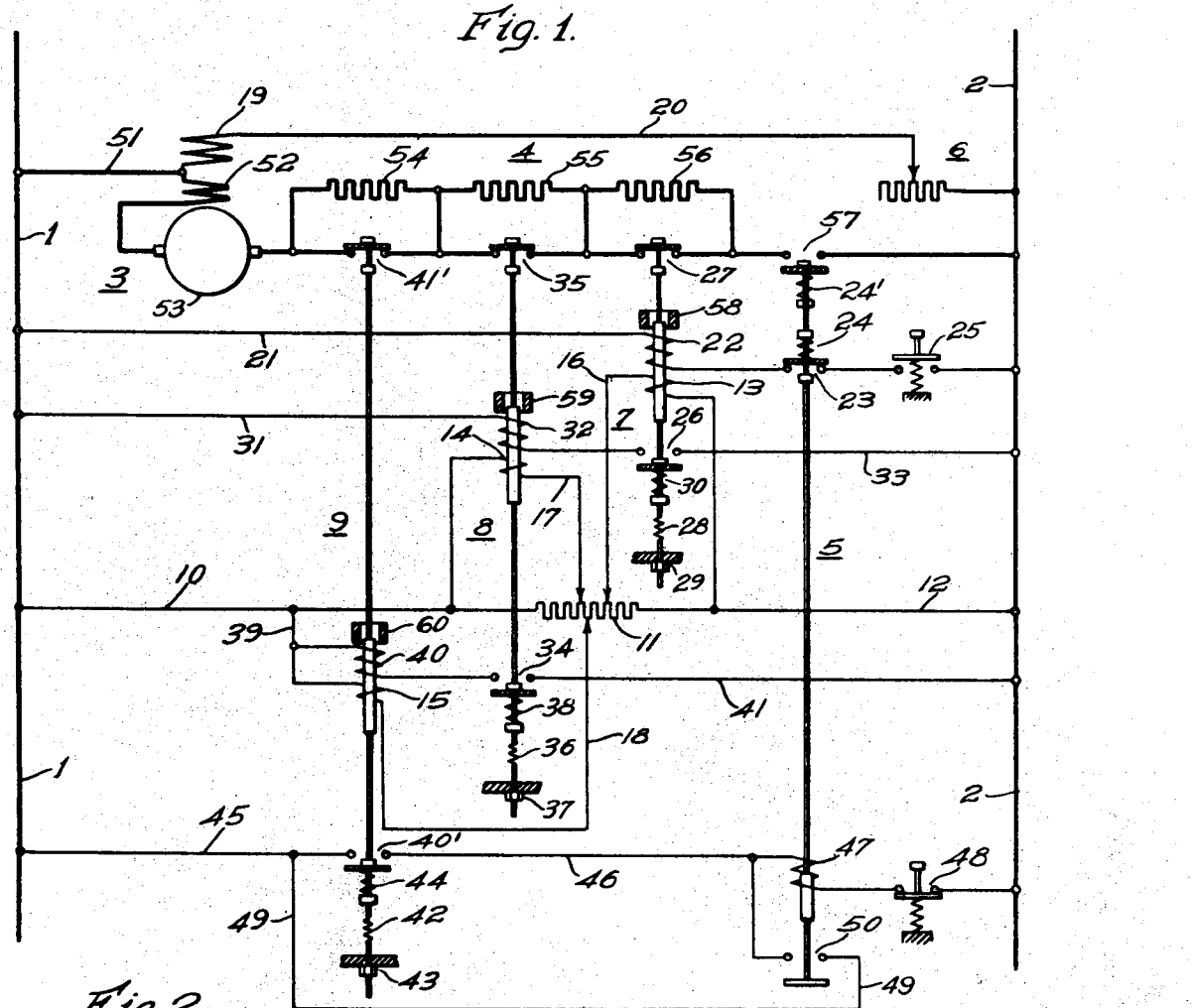
Figure 1 is a diagrammatic showing of the system of control constituting the subject matter of the invention.

Referring more particularly to the diagrammatic showing of my invention, the reference character 3 designates a compound-wound direct-current motor disposed to be connected to a pair of buses 1 and 2 energized from a suitable source of direct-current power, not shown.

A line or motor circuit contactor 5 is disposed to connect the motor circuit to the buses 1 and 2, and a plurality of accelerating contactors 7, 8 and 9 is provided for controlling the rate of acceleration of the motor 3 by short-circuiting sections of a resistor 4.

To gain a more complete understanding of the objects of my invention, a detailed discussion of the sequence of operation will be given. If it be assumed that buses 1 and 2, shown in Fig. 1, are suitably energized from a source of direct current, not shown, an energizing circuit will be established from bus 1 through conductor 10, resistor 11, and conductor 12 to the bus 2. The resistor 11 is designed to receive three sliding contact members, which may be independently slid over the coils of the resistor 11 to any position. These contact members are connected to conductors 16, 17 and 18, respectively, for energizing the neutralizing coils 13, 14 and 15 of the time-limit accelerating contactors 7, 8 and 9, respectively. The advantages and functions of the neutralizing coils will appear from a more detailed discussion given hereinafter.

Assuming that it is desired to start the motor 3, the start push-button switch 25 is actuated to establish a circuit from the energizing bus 1 through conductor 21, main or magnetizing coil 22 of the time-limit accelerating contactor 7, back contact member 23 of the line contactor 5, and start push-button switch 25 to the bus 2. Energization of the magnetizing coil 22 causes the immediate operation of the time-limit accelerating contactor 7 to close the contact members 26 and open the contact members 27. It will be noted that a pair of lugs and a spring arrangement 30 are associated with the movable part of the contact members 26, so that the circuit at contact members 26 is closed an instant before the circuit at contact members 27 is opened. The particular operation at this point of the starting sequence is not very important, but it is desirable that, when the coil 22 is deenergized, the contact members 27 close an instant before contact members 26 open. This is of advantage in preventing the starting of the deenergization of subsequent time-limit accelerating contactors before the resistor section 56 or 55, as the case may be, is shunted out of the armature circuit of the motor 3.

Closing of the contact members 26 establishes a circuit from the bus 1 through conductor 31, the main or magnetizing coil 32 of the time-limit accelerating contactor 8, contact members 26, and conductor 33 to the energized bus 2. Operation of the accelerating contactor 8 closes the contact members 34, and immediately thereafter opens the contact members 35, thus removing the shunt for the resistor section 55 of the starting resistor 4. The operation of the accelerating contactor 8 establishes a circuit from the energized bus 1 through conductors 10 and 39, through main or magnetizing coil 40, contact members 34, and conductor 41 to the energized bus 2. The operation of the time-limit accelerating contactor 9 causes the closing of the contact members 40' and the opening of the contact members 41', thereby respectively energizing the actuating coil 47 of the line contactor 5 and removing the shunt for the resistor section 54 of the starting resistor 4.

The energization of the actuating coil of the line contactor 5 is effected through conductor 45, contact members 40', conductor 46, actuating coil 47 of the line contactor 5, and stopping switch 48 to the energized bus 2. It should be noted that the accelerating contactors 8 and 9 have spring arrangements 38 and 44, respectively, similar to the spring arrangement 30 shown with the accelerating contactor 7.

The operation of the line contactor 5 establishes a holding circuit for coil 47 through conductor 49 and contact members 50, and also an energizing circuit for the motor 3, by the closing of the contact members 57, which circuit may be traced from bus 1 through conductor 51, series field winding 52 and armature 53 of the motor 3, resistor sections 54, 55 and 56 of the starting resistor 4 and contact members 57 to the energized bus 2. It should be noted that the separate or shunt field winding 19 is fully energized from bus 1 through conductor 51, field winding 19, conductor 20, and field rheostat 6, before the line contactor 5 has closed the contact members 57. It is thus obvious that the motor is fully excited and can start with the maximum torque it can develop with all of the starting resistor sections in the armature circuit of the motor. The line contactor 5 has the contact members 57 and 23 so designed that the contact members 57 close an instant before the contact members 23 open. This will be apparent from an inspection of the lug and spring assemblies 24 and 24' shown with the contactor 5.

Opening of the contact members 23 deenergizes the main or magnetizing coil 22 of the time-limit accelerating contactor 7. This time-limit accelerating contactor is provided with a very low resistance closed circuit 58, which in practice is usually a copper sleeve, tube or annulus surrounding the core of the contactor and thus constitutes a current-circulating coil. It is thus inductively related to the coil 22. Opening of the circuit for the coil 22 will thus induce a heavy current in the circuit 58, tending to maintain the flux in the magnetic circuit of the time-limit contactor 7.

In the absence of the low resistance closed circuit 58, the magnetic flux in the magnetic circuit of the time-limit accelerating contactor 7 would decay very rapidly to some lower value representing the residual magnetism in the magnetic circuit. By the use of the circuit 58, the rate of dissipation or decay of the magnetic flux in the magnetic circuit is very materially decreased, namely, the slope of the curve representing the magnetic decay is not nearly so steep, but eventually comes down to some low value again representing substantially the same residual magnetism in the magnetic circuit. It is thus obvious that the time-limit accelerating contactor will not drop to the position shown, prior to a lapse of time determined by the resistance value of the circuit 58.

To further lengthen the time constant of the time-limit accelerating contactor 7, the neutralizing coil 13 is utilized, being designed and energized in such a manner as to oppose the magnetic effect of the main coil 22. Normally, the magnetic effect of the neutralizing coil 13 is quite negligible. However, when the magnetic flux in the magnetic circuit of the time-limit contactor has decreased to somewhere near the value of its residual magnetism, the effect of coil 13 becomes relatively large and operates to substantially annihilate the residual magnetism at a rate determined by the characteristics of the closed circuit 58. It is thus obvious that the time-limit accelerating contactor 7, since the rate decay of the flux in the magnetic circuit can be definitely controlled from a given maximum flux to a zero flux, may be caused to operate a definite time after the opening of the contact members 23, and that such definite time is enlarged by the combined action of the closed circuit 58 and the neutralizing coil 13. Further, the time-limit accelerating contactor 7 is provided with a spring 28 biasing the contact members to the position shown, which spring may be adjusted in its biasing effect over a selected range by means of the adjusting screw 29. The time constant of the time-limit accelerating contact 7 is thus relatively large and yet may be selectively controlled by the adjustable neutralizing coil 13 and the adjustable spring 28.

Tests with this type of accelerating contactor have shown that a time as high as thirteen seconds can be secured with reasonable reliability and that very reliable operation can be secured from zero up to eight seconds. Further, it should be noted that the time-limit accelerating contactor has its main magnetizing coil 22 energized from the buses 1 and 2, which are constant voltage buses, and has its neutralizing coil 13 energized at a selected voltage determined by the position of conductor 16 on the resistor 11; thus making the energization, as well as the dissipation of the magnetic flux, entirely independent of the load on the motor or its counter-electromotive force.

After the lapse of a definite interval of time, the contact members 26 are opened an instant after the contact members 27 have been closed, thus deenergizing the main magnetizing coil 32 of the time-limit accelerating contactor 8. The closed circuit 59 thus decreases the rate of dissipation of the magnetic flux in the magnetic circuit of the contactor 8, and the neutralizing coil 14 provides that the decay is continued to substantially zero flux in the magnetic circuit. The spring 36 and its adjusting feature 37 also control the operation of contactor 8 similar to the controlling operation for the corresponding elements for time-limit accelerating contactor 7.

Opening of the contact members 34, which open an instant after the contact members 35 are closed, causes the deenergization of coil 40, which is the main magnetizing coil of the time-limit accelerating contactor 9. The closed circuit 60 coacting with the neutralizing coil 15, the spring 42, and its adjusting feature 43 cause the closing of the contact members 41 and immediately thereafter the opening of contact members 40'. Opening of the contact members 40' does not affect the operation, because the circuit for the coil 47 of line contactor 5 is closed through the holding circuit hereinbefore mentioned.

Figure 2:
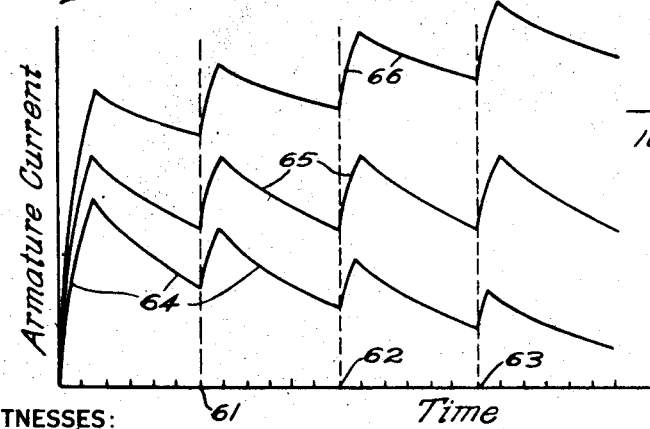
Fig. 2 illustrates by means of curves how the acceleration takes place within a definite time and independent of the armature current or different loads on the motor.

From the foregoing discussion, it is obvious that the resistor sections 56, 55 and 54 are successively shunted out of the armature circuit of the motor 3, and that such successive shunting operation is effected independently of the load on the motor. Fig. 2 illustrates this for three different starting loads on the motor. Curve 64 shows a starting sequence for a motor lightly loaded, or possibly operating at no load; curve 65 shows a starting sequence for a motor normally loaded; whereas curve 66 shows a motor overloaded. In these curves, the ordinates represent armature current, while the abscissae represent time. The points 61, 62 and 63 represent the time or period of operation of the respective time-limit accelerating contactors, which period of operation is always a definite yet selectable number of units of time, in this case six, after the operation of the preceding accelerating contactor. In many installations, this is very desirable because the motor is to be accelerated and connected to full-line voltage, with a definite interval of time regardless of the load on the motor.

For the novel features of the time-limit accelerating contactor itself, reference should be had to the application of Walter Schaelchlin and E. Frisch, Serial No. 670,498, filed May 11, 1933, relating to Time limit contactor.

Figure 3:
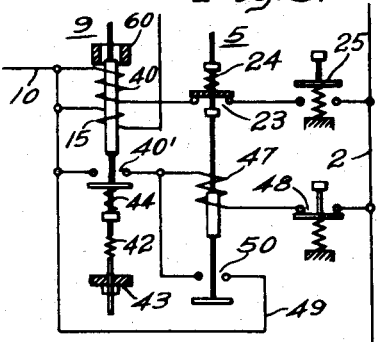
Fig. 3 is a diagrammatic showing of a simple modification showing the circuit arrangement when but one starting resistor section is utilized.

The showing in Fig. 3 represents a modification where but one starting resistor section is utilized to accelerate the motor. The operation of the time-limit contactor 9, energized directly by the operation of switch 25, effects the energization of the contactor 5 which in turn initiates the reverse or time-limit operation of the accelerating contactor 9. While the time-limit or accelerating contactors 7 and 8 in the showing of Fig. 1 and switch 25 and contactor 5 all operate in the sequence explained, it is nevertheless true that the operation of contactor 5, without reference to any order of operation, effects the operation of time-limit contactor 9 or 7 or 8. Applicant is, therefore, in the absence of the showing in Fig. 3, entitled to claims covering elements 25, 9, 5 and 9 operating either successively or sequentially, or both, in the order in which these elements are here recited.

It should be noted that the starting controller herein disclosed does not require a plurality of "set up" relays and additional circuits, and that the acceleration is effected by the utilization of the inductive time constants of specially designed time-limit accelerating contactors. Thus a system of control is provided for the starting of a direct-current motor which is very often only a third as expensive as the starting controllers now on the market, and, furthermore, is very much more simple and requires a control panel only a fraction of the size of the control panels now used by the trade.

I do not wish to be restricted to the specific structural details, arrangement of parts, or circuit connections, herein set forth, as various modifications thereof may be effected without departing from the spirit and scope of my invention. I desire, therefore, that only such limitations shall be imposed as are indicated by the appended claims and by such prior art as may be pertinent.

I claim as my invention:

1. In a system of control for an electric motor, in combination, a source of energy, a motor, current-limiting means, comprising a plurality of sections, for said motor, electromagnetic time-limit means biased to a given operative position and operable after a predetermined interval of time independent of the operating characteristics of the motor, for shunting successive sections of said current-limiting means, means for moving said time-limit means to inoperative position, a switch, energized by the movement of said time-limit means to inoperative position, for connecting said motor and current-limiting means to the source of energy, and means, operated by said switch, for initiating the successive operation of said time-limit means to shunt successive sections of the current-limiting means within a definite interval of time.

2. In a system of control for a motor, in combination, a source of energy, a motor, a starting contactor for connecting the motor to the source of energy, a starting resistor therefor, and a plurality of electromagnetic time-limit contactors, comprising means for magnetizing the contactors, means for decreasing the rate of decay of the magnetism when said magnetizing means is deenergized and means for causing the decay to continue till there is no residual magnetism left in the contactors, for successively shunting sections of the starting resistor to connect the motor to the full voltage of the source of supply a definite interval of time after the operation of the starting contactor.

3. In a system of control for a motor, in combination, a source of energy, a motor, a starting resistor, an electromagnetic time-limit contactor for shunting said resistor, means for energizing said contactor, a line switch for connecting the motor and starting resistor to the source of energy and for effecting the deenergization of the energizing means for the time-limit contactor, rate control means for decreasing the rate of decay of the magnetism of the time-limit contactor, and neutralizing control means for continuing the decay till substantially no residual magnetism remains in the contactor, said time-limit contactor being adapted to shunt said starting resistor when the effect of said rate control means and neutralizing control means has substantially ceased.

4. In a system of control for an electric motor including an accelerating resistor, an electromagnetic time-limit contactor, a source of electrical energy, said contactor having two windings each energized from the source of energy so as to be independent of the operating characteristics of the motor, and a third closed circuit winding inductively related to said first-named two windings, one of the first-named windings being disposed to control the closing of the contactor, and means for deenergizing the said winding controlling the closing of the contactor, thereby placing the closing of the contactor solely under the control of the other two windings.

5. A control system for an electric motor including a plurality of accelerating resistors for controlling the acceleration of the motor, a contactor for each resistor, and a source of electrical energy, said contactors each having three windings, two of said windings being adapted to be energized from the source of energy so as to be independent of the operating characteristics of the motor, one of said two windings being adapted to open the contactor and the remaining two windings being disposed to control the closing of the contactor, and means for successively deenergizing the windings controlling the opening of the respective contactors, thereby placing the closing of the respective contactors solely under the control of the remaining two windings.

6. A control system for an electric motor including a starting resistor for controlling the motor, a source of electrical energy, an electromagnetic contactor having a magnetizing coil for controlling the opening of the contactor and disposed to be connected to the source of energy to be subject to the voltage of said source, means for effecting the deenergization of the magnetizing coil, a demagnetizing coil for the contactor connected directly to the source of energy and a current-circulating coil, said two last-named coils being disposed to control the closing of the contactor when the magnetizing coil is deenergized.

7. A control system for electric motors including a starting resistor, a source of electrical energy, a normally closed contactor for shunting a section of said resistor, a winding responsive to the voltage of said source for effecting the opening of the contactor, and a second winding for the contactor connected to the source of energy and disposed to control the closing of the contactor when the opening coil is deenergized.

8. A control system for electric motors including an accelerating resistor, a source of electrical energy, a plurality of normally closed accelerating contactors disposed to operate in succession to control the resistance value of the resistor, windings disposed to be connected to the source of energy and thus subject to the voltage thereof for holding the respective contactors open, windings associated with each contactor and connected directly to the source of energy for controlling the closing of the respective contactors, and timing windings for also controlling the closing of the respective contactors.

9. A control system for an electric motor including a resistor for controlling the motor, a source of electrical energy, an electromagnetic switch for controlling the resistor, a magnetizing winding, disposed to be connected to the source of energy, for controlling the opening of said switch, a demagnetizing winding connected to said source of energy and disposed to act in opposition to the magnetizing winding, and means for deenergizing the magnetizing winding, thereby placing the closing of the switch under the control of the demagnetizing winding.

10. In a control system, in combination with an electrical motor, a source of electrical energy for the motor and control system, a series of starting resistors for the motor, of a plurality of accelerating contactors having a time-delay action, means actuated by the contactors for connecting the motor and the series of starting resistors in circuit relation with the said source and for successively disconnecting the series of starting resistors from the said electrical source, whereby the motor is progressively more strongly energized in timed sequence.

11. In a control system, in combination, a source of electrical energy for the control system, a plurality of voltage-responsive devices disposed for energization from the said electrical source and responsive to the voltage thereof, loop circuits inductively related to said voltage responsive devices, means for establishing a plurality of electrical circuits, said means being actuated by the voltage-responsive devices, and means for so energizing the voltage-responsive devices independent of the electrical conditions of said circuits and cooperating with said loop circuit as to actuate the circuit-establishing means after the lapse of predetermined intervals of time.

12. In a control system, in combination, an electric motor, a source of electrical energy for said motor and control system, said source of energy having a substantially constant voltage, a plurality of electrical devices, each having a current-circulating coil and each having a pair of circuits, responsive to the voltage of said source of energy and thus, for any given adjustment, having relatively large inductive time constants of substantially fixed value, switching means responsive to the operation of said electrical devices for connecting the motor to said source of energy, and means responsive to the operation of said switching means for successively and after the lapse of definite time intervals deenergizing one of the pair of circuits whereby the motor is subjected to progressively higher voltages after definite time intervals.

13. In a control system, the combination with a dynamo-electric machine and current limiting means therefor, of a time-limit switch for short-circuiting said means, biased to closed position and having a magnetizing coil for moving said switch to one position against the bias and a neutralizing coil for controlling the movement of the switch to a second position when said magnetizing coil is denergized, said coils being connected to be independent of the operating characteristics of said machine, a line switch for said machine biased to open position, and means responsive to the movement of said first named switch to said one position for closing said line switch, said first-mentioned switch being responsive to such closure for closing itself after the lapse of a predetermined interval of time.

14. In a control system, the combination with a dynamo-electric machine element and current-limiting means therefor, of a time limit switch, for governing said means, having a main magnetizing coil for energizing the switch to one position and a neutralizing coil for controlling the movement of the switch to another position when said main coil is deenergized, said coils being connected to be independent of the operating characteristics of said element, a second switch for controlling the energization of said element, and means responsive to the first mentioned switch when moving to the said one position for effecting the actuation of the second switch, said first mentioned switch being responsive to such actuation of the second switch for reversing its said operation to take said other position after the lapse of a definite interval of time.

15. In a control system, the combination with a dynamo-electric machine element and current-limiting means therefor, of an inductive time-limit switch for governing said means, a magnetizing coil for the switch and a neutralizing coil for the switch, said coils being connected to be independent of the operating characteristics of said machine element, a second switch for controlling the energization of said element, means responsive to a predetermined operation of the first-mentioned switch for effecting actuation of said second switch, and means operable by said second switch for deenergizing the magnetizing coil whereby an operation of the time-limit switch is effected after the lapse of a definite interval of time.

WALTER SCHAELCHLIN.